C. L. VALE.

Cracker-Machine.

No. 9,151. Reissued April 13, 1880.

Witnesses.
Penn Halsted
Geo. W. Smith.

Inventor:
Charles L. Vale
by John J. Halsted
Atty

N. PETERS, PHOTO-LITHOGRAPHER, WASHINGTON, D. C.

UNITED STATES PATENT OFFICE.

CHARLES L. VALE, OF BELOIT, WISCONSIN.

CRACKER-MACHINE.

SPECIFICATION forming part of Reissued Letters Patent No. 9,151, dated April 13, 1880.

Original No. 187,069, dated February 6, 1877. Application for reissue filed November 14, 1879.

*To all whom it may concern:*

Be it known that I, CHARLES L. VALE, of Beloit, in the county of Rock and State of Wisconsin, have invented certain Improvements in Cracker-Machines, of which the following is a specification.

The main object of my invention is to form crackers or snaps from a mass of dough without rolling the same into sheets by cutting sections from dough as it is made to escape through proper apertures in a suitable press.

The invention consists in making a cracker-machine having an oscillating frame carrying a knife-frame swinging thereon for imparting four motions to the knife or cutter; also, in feeding or pressing forward the dough by the action of the oscillating frame; also, in combining the pendent oscillating frame by suitable connections with a dough-press having discharging-apertures; also, in combining with the oscillating frame a cutter-frame pivoted thereon and carrying a stretched flexible cutter; also, in combining with an oscillating frame a cutter-frame carried thereon; also, in providing such cutter-frame with adjustable stops to limit its vibrations; also, in combining with the oscillating frame which carries the cutter a dog for actuating the main shaft; also, in a special construction of the dough-box, and in other details, all which will be more fully hereinafter described.

Figure 1:
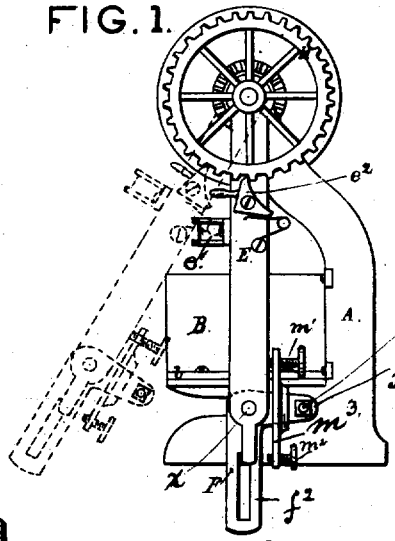
Figure 3:
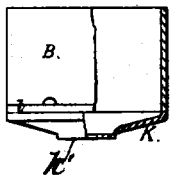
Figure 5:
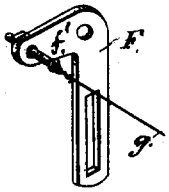
Figure 2:
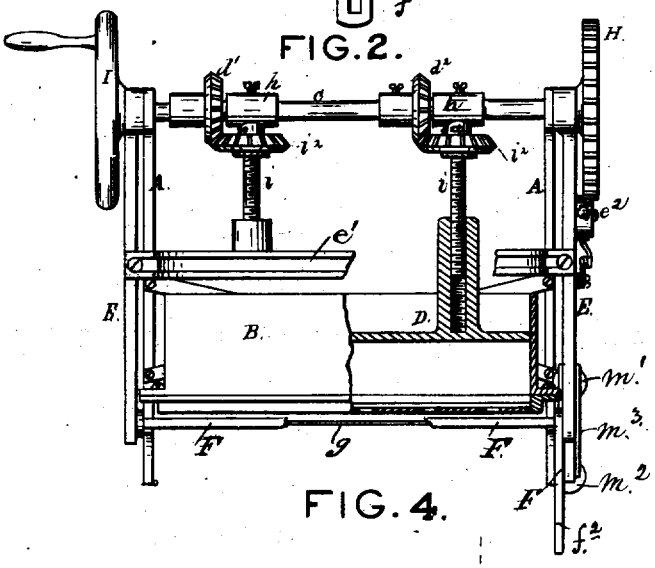
Figure 4:
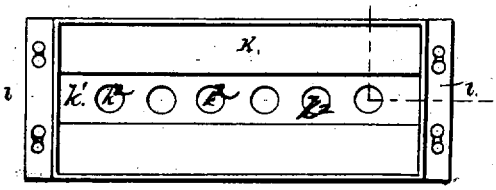

The machine is illustrated in the end view, Figure 1, and in the side view, Fig. 2. Fig. 3 shows an end view of the box or press; Fig. 4, a top view of the same; and Fig. 5, a fragmentary detail, showing the cutter.

The frame A supports the box or press B at its lower part, and at its upper part carries a shaft, C, having gearing to actuate the follower D of the press. The shaft has also at each end a lever, E, these levers being braced together by a cross-piece, $e'$, and capable of oscillating on said shaft, and thus forming a swinging frame. This oscillating or swinging frame carries another swinging frame, F, pivoted or centered thereon, and which is the knife-carrier. One of the ends of this frame F is an elbow-lever. To one arm, $f'$, of this lever, and to a similar arm on the opposite end of the frame, is attached the knife or cutter $g$, which extends across the machine, as shown in Fig. 2, and the other end, $f^2$, of this elbow-lever is slotted, as shown, to permit it to be connected with any reciprocating or actuating device of any suitable driving machinery. The knife $g$ is a slender strip of metal or a wire, held sufficiently rigid to cut dough by being strained, and held by bolts connected to its ends.

The swinging frame E has fastened to one of its sides a dog or pawl, $e^2$, made to engage with the notches or teeth in a wheel, H. This wheel H is fastened to the shaft C, as are also the bevel-wheels $d'$ and $d^2$ and the hand wheel or crank I, and this crank serves to adjust the follower and also to elevate it for a new supply or charge of dough after a previous charge has been forced through the press. The T-pieces $h$ $h$ on the shaft are not fastened, but allow the shaft to turn in them, and have sockets to retain the ends of the follower-screws $i$ $i$ and to receive the upward thrust of the screws. Bevel-wheels $i^2$ $i^2$ on the screws $i$ $i$ engage with the bevel-wheels $d'$ $d^2$.

The box B consists of a rectangular frame made to fit the follower, and has a detachable bottom, K, made in one piece of casting, and having a sunken or recessed portion, $k'$, and having holes $k^2$ $k^2$ for the dough to escape through. This sunken portion $k'$ projects outward and centrally below the line of the remainder of the bottom, the bottom being inclined from both edges toward such projecting part, this latter part, however, being left of sufficient breadth to permit the making of the proper holes $k^2$ therein. This is important in connection with a cutter swinging beneath it in curved paths, for, if the entire bottom were at its outside level for its whole breadth, it would be liable to arrest or interfere with the movement of the cutter, and by giving a corresponding form to the bottom at its inside the action of the follower in forcing the dough through the holes is greatly facilitated, as it presses the dough down the inclines toward these outlet-holes.

The bottom is fastened to the frame by screws passing through slotted holes in the flanges $l$ $l$, which serve also as lugs to connect the box to the frame A.

The manner of using the machine may be thus described: A reciprocating movement is, by any suitable machinery, imparted to the swinging knife-carrier F by a connection thereto—as, for instance, at its lower or slotted portion. This carrier is free to move or oscillate slightly on its axis $x$, the amount of oscillation depending on the adjustment of the screws at $m'$ $m^2$, which, as will be seen, are carried by a bar or piece, $m^3$, on this knife-carrier; and when this carrier is pulled outward or to the left, as shown in dotted lines in Fig. 1, it throws the knife downward; but when it is pushed backward toward the frame it raises the knife again.

In the view shown in Fig. 1 the swinging frame E has moved to the right its greatest distance, and is ready to return; and it will be noticed that the upper screw, $m'$, is in contact with the frame and the knife is at its highest point relatively to the axis $x$. The return movement, or to the left, would bring the lower screw, $m^2$, in contact with the frame, and at the same time lower the knife from the position it previously held, and consequently away from the bottom of the box. Continued movement to the left would bring the swinging frame E to the position shown by the dotted lines, which indicate the extent of its desired movement. This movement to the left of the frame E has also, by means of the dog $e^2$, wheel H, shaft C, and bevel-wheels, imparted to the screws that operate the follower D a slight rotary movement, which causes the follower to move downward, thus pressing a portion of the dough through the apertures at each oscillation. Then, moving to the right, it raises the knife, and a continued movement in the same direction brings it under the apertures $k^2$ of the dough-box, and it cuts off in sections whatever dough may have been passed through them. Thus the knife frame or carrier F has a compound motion made up of four distinct movements—namely, the inward and outward movements due to the swinging of the frame E upon its shaft C and the rising and falling or rocking movements due to the oscillations of the frame F upon its center or axis $x$; and it will therefore be evident that after the dough has been cut off and the knife commences its return movement it instantly lowers, so as to positively clear it from contact either with the bottom of the box or with the bottom surface of the dough in the holes $k^2$ $k^2$, and that after the frame E has reached its farthest outward movement and its inward movement toward the dough again commences the knife is at once forced to its former raised position, so as to be again ready to cut off the dough.

It will be seen that the movements of the swing-frame E through those of the carrier F actuate, by means of pawl $e^2$, the shaft C, and thence, also, the follower D, which presses down the dough and forces it through the openings $k^2$.

I claim as my invention—

1. The combination, in a cracker-machine, of an oscillating frame and a knife-carrier frame pivoted to swing thereon, as a means for imparting a four-motion action to the knife or cutter.

2. In a cracker-machine, the combination of an oscillating frame and a knife-carrier pivoted thereon with a dough-box having apertures for the escape of the dough.

3. The combination, with the dough-box and its follower, of a frame hung upon a horizontal main shaft, and arranged to swing in vertical planes, and connected substantially as described, to operate the follower.

4. The combination of the oscillating frame E with the swing-frame F, pivoted thereon, and carrying a flexible cutter held rigidly by being stretched between two fastenings.

5. The combination of an oscillating frame with a cutter-frame pivoted thereto, and having adjustable stops to limit its vibrations.

6. The combination, with a swing-frame, E, of a cracker-machine, of a cutter-frame carried thereon.

7. In combination with the oscillating frame E, a swinging frame, F, provided with a bar, $m^3$, and adjustable screw-stops $m'$ $m^2$ thereon, substantially as and for the purposes described.

8. In combination with a hanging oscillating frame arranged to swing freely in vertical planes, and carrying a cutter moving in a similar plane, a dog, $e^2$, also carried thereon, and serving to actuate the horizontal main shaft C.

9. In combination, the pendent swinging frame hung on and serving to drive the main shaft, its dog $e^2$, notched wheel H, main shaft C, bevel-wheels and screws, and dough box or press B, the combination being and operating substantially as shown and described.

10. In a cracker-machine, in combination with a swinging knife, the removable bottom K, made in one piece of metal, having flanges with holes for bolts, and a sunk or outward-projecting central portion, $k'$, with apertures therein for the escape of the dough, substantially as described, and for the purpose set forth.

CHARLES L. VALE.

Witnesses:
SIDNEY SMITH,
E. A. DAY.